United States Patent
Cha

(10) Patent No.: US 11,446,959 B2
(45) Date of Patent: Sep. 20, 2022

(54) WHEEL STEERING ANGLE ADJUSTMENT DEVICE FOR VEHICLE OPERATED BY MAN POWER

(71) Applicant: ORBITN CO., LTD., Seoul (KR)

(72) Inventor: Kyung Ae Cha, Seoul (KR)

(73) Assignee: Orbitn Co., Ltd., Seoul (KR)

( * ) Notice: Subject to any disclaimer, the term of this patent is extended or adjusted under 35 U.S.C. 154(b) by 0 days.

(21) Appl. No.: 17/374,472

(22) Filed: Jul. 13, 2021

(65) Prior Publication Data

US 2022/0088965 A1    Mar. 24, 2022

(30) Foreign Application Priority Data

Sep. 24, 2020 (KR) .................. 10-2020-0123964

(51) Int. Cl.
*B60B 33/02*    (2006.01)
*B60B 33/00*    (2006.01)
(Continued)

(52) U.S. Cl.
CPC ........ *B60B 33/025* (2013.01); *B60B 33/0005* (2013.01); *B60B 33/006* (2013.01);
(Continued)

(58) Field of Classification Search
CPC . B60B 33/02; B60B 33/025; B62B 2301/046; B62B 2301/0463; B62B 2301/04632
See application file for complete search history.

(56) References Cited

U.S. PATENT DOCUMENTS 1,661,889 A * 3/1928 French ............... F16H 7/18
16/35 R
4,028,773 A * 6/1977 Morgan ............. B60B 33/02
16/35 R
(Continued)

FOREIGN PATENT DOCUMENTS

JP    2002-166709 A    6/2002
JP    3091505 U    2/2003
(Continued)

OTHER PUBLICATIONS

Notice of Allowance dated Dec. 9, 2020 in Korean Application No. 10-2020-0123964, in 2 pages.

*Primary Examiner* — Jeffrey O'Brien
(74) *Attorney, Agent, or Firm* — Knobbe Martens Olson & Bear LLP

(57) ABSTRACT

This application relates to a wheel steering angle adjustment device for a vehicle operated by manpower. The device may include a fixed body including a rotation support, a rotation body, a lift member coupled to the rotation support, a locking switch coupled to the lift member, and a plurality of fixing groove portions in the outer peripheral surface of the rotation support. The device may also include a fixing protrusion protruding from the locking switch and configured to be detachably coupled to the fixing groove portions, a rotation range limiting stopper provided on a lower portion of the lift member, and a rotation guide groove portion provided concavely in an upper surface of the rotation body. As the rotation range limiting stopper becomes stuck on an end portion of the rotation guide groove portion, an angle by which the rotation body is rotatable relative to the fixed body is limited.

4 Claims, 8 Drawing Sheets

(51) Int. Cl.
  *B62B 3/00* (2006.01)
  *A61H 3/04* (2006.01)
(52) U.S. Cl.
  CPC ...... *B60B 33/0026* (2013.01); *B60B 33/0068* (2013.01); *B60B 33/02* (2013.01); *B62B 3/001* (2013.01); *A61H 3/04* (2013.01); *A61H 2201/1253* (2013.01); *B62B 2301/044* (2013.01); *B62B 2301/046* (2013.01); *B62B 2301/0463* (2013.01); *B62B 2301/04632* (2013.01)

(56) References Cited

U.S. PATENT DOCUMENTS

| | | | | |
|---|---|---|---|---|
| 4,349,938 A | * | 9/1982 | Fontana | B60B 33/021 |
| | | | | 16/35 R |
| 4,575,896 A | * | 3/1986 | Nakao | B62B 9/18 |
| | | | | 16/35 R |
| 5,745,951 A | * | 5/1998 | Waner | B60B 33/0007 |
| | | | | 16/31 R |
| 6,212,733 B1 | * | 4/2001 | Yeh | B60B 33/0068 |
| | | | | 16/35 R |
| 6,871,380 B2 | * | 3/2005 | Chen | B62B 7/04 |
| | | | | 16/35 R |
| 7,210,690 B2 | * | 5/2007 | Tan | B60B 33/025 |
| | | | | 280/47.38 |
| 9,168,785 B2 | * | 10/2015 | Spektor | B60B 33/00 |
| 9,751,363 B2 | * | 9/2017 | Degrace | B60B 33/028 |
| 9,770,945 B2 | * | 9/2017 | Han | B60B 33/0084 |
| 10,300,741 B2 | * | 5/2019 | Finstad | B60B 33/025 |
| 11,207,917 B1 | * | 12/2021 | Lin | B60B 33/021 |
| 11,247,509 B2 | * | 2/2022 | Hartkopf | B60B 33/0086 |
| 2007/0204429 A1 | * | 9/2007 | Cheng | B60B 33/0049 |
| | | | | 16/35 R |

FOREIGN PATENT DOCUMENTS

| | | |
|---|---|---|
| JP | 2003-245308 A | 9/2003 |
| KR | 20-0437094 Y1 | 10/2007 |

* cited by examiner

WHEEL STEERING ANGLE ADJUSTMENT DEVICE FOR VEHICLE OPERATED BY MAN POWER

CROSS-REFERENCE TO RELATED APPLICATION

This application is based on and claims priority under 35 U.S.C. § 119 to Korean Patent Application No. 10-2020-0123964, filed on Sep. 24, 2020, in the Korean Intellectual Property Office, the disclosure of which is incorporated by reference herein in its entirety.

BACKGROUND

Field

One or more embodiments relate to a wheel steering angle adjustment device, and more particularly, to a device for adjusting the steering angle of a wheel of a vehicle operated by manpower.

Description of the Related Technology

The history of humans using wheels to transport goods began B.C. Vehicles that are operated by manpower rather than by engines or motors are widely used even today. Typical examples of vehicles operated by manpower include walking aids, strollers, manual carts, bicycles, and the like. A vehicle operated by manpower is usually provided with a plurality of wheels. Some of the wheels are adjustable in steering angle for changing the travel direction.

SUMMARY

One or more embodiments include wheel steering angle adjustment devices for vehicles operated by manpower, the wheel steering angle adjustment devices being configured such that users may easily select the range of the steering angle of wheels.

Additional aspects will be set forth in part in the description which follows and, in part, will be apparent from the description, or may be learned by practice of the presented embodiments of the disclosure.

According to one or more embodiments, a wheel steering angle adjustment device for a vehicle operated by manpower includes: a fixed body including a rotation support having a cylindrical outer peripheral surface; a rotation body arranged below the fixed body and rotatably installed on the fixed body; a lift member installed such that when the lift member is coupled to the rotation support, the lift member is not rotatable relative to the rotation support but is slidable in a longitudinal direction of the rotation support; a locking switch coupled to the lift member; a plurality of fixing groove portions provided concavely in the cylindrical outer peripheral surface of the rotation support at regular intervals in the longitudinal direction of the rotation support; a fixing protrusion protruding from the locking switch and configured to be detachably coupled to the plurality of fixing groove portions; a rotation range limiting stopper provided on a lower portion of the lift member; and a rotation guide groove portion provided concavely in an upper surface of the rotation body and extending in a rotation direction of the rotation body, wherein, as the rotation range limiting stopper becomes stuck on an end portion of the rotation guide groove portion, an angle by which the rotation body is rotatable relative to the fixed body is limited.

The rotation guide groove portion may include multi-stage groove portions having different depths, and the angle by which the rotation body may be rotatable relative to the fixed body is limited as the rotation range limiting stopper becomes stuck on an end portion of one of the multiple-stage groove portions of the rotation guide groove portion.

The locking switch may be configured to operate like clothespin based on a hinge shaft provided in the lift member.

The wheel steering angle adjustment device may further include: a slide groove portion which is provided concavely in the cylindrical outer peripheral surface of the rotation support at a position not interfering with the plurality of fixing groove portions and extends in the longitudinal direction of the rotation support; and a slide rail which protrudes from the lift member and is accommodated in the slide groove portion.

The lift member may include a lifting handle configured to protect a handle of the locking switch and receive an external force when the lift member is lifted and lowered.

BRIEF DESCRIPTION OF THE DRAWINGS

The above and other aspects, features, and advantages of certain embodiments of the disclosure will be more apparent from the following description taken in conjunction with the accompanying drawings.

DETAILED DESCRIPTION

Figure 1:
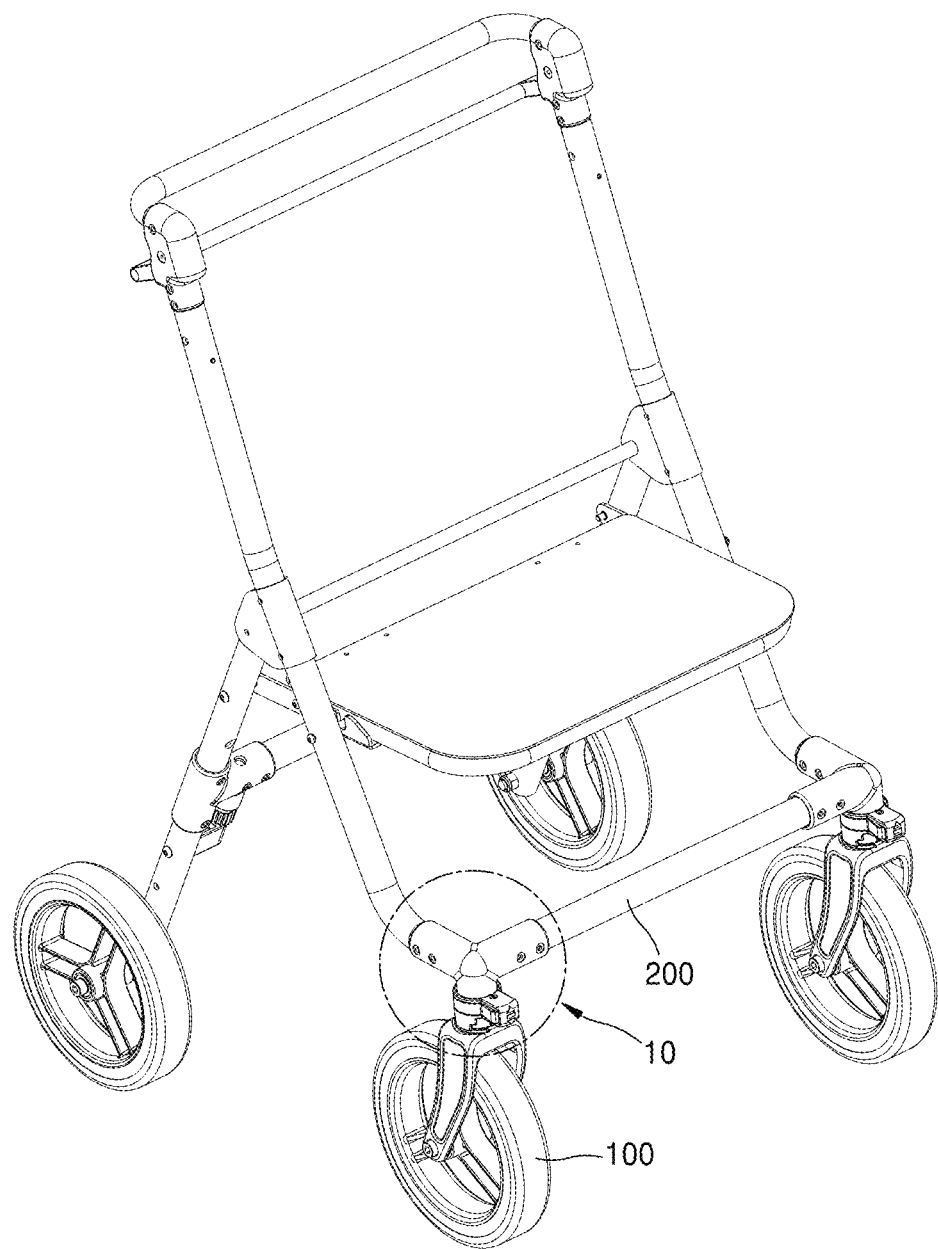
FIG. 1 is a view illustrating a walking aid employing a wheel steering angle adjustment device according to an embodiment.

In general, walking aids or strollers are configured to be adjustable in the steering angle of front wheels. As a structure for changing the steering angle of a wheel, a fork which supports a rotation shaft of the wheel may be made rotatable relative to the body of a vehicle. An example of such a stroller having steerable wheels is disclosed in Korean Utility Model Registration No. 20-0437094. However, wheel steering devices of the related art are not configured to limit the steering angle of wheels and thus allow rotation of 360° or more, and thus, there may be a risk that a vehicle travels in an unexpected direction when used by an elderly person or a patient with limited mobility. In particular, the steering angle of wheels of walking aids, which are mainly used by the elderly or patients with deteriorated physical functions, needs to be adjusted within a specified range.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the present disclosure will be described with reference to the accompanying drawings.

Figure 2:
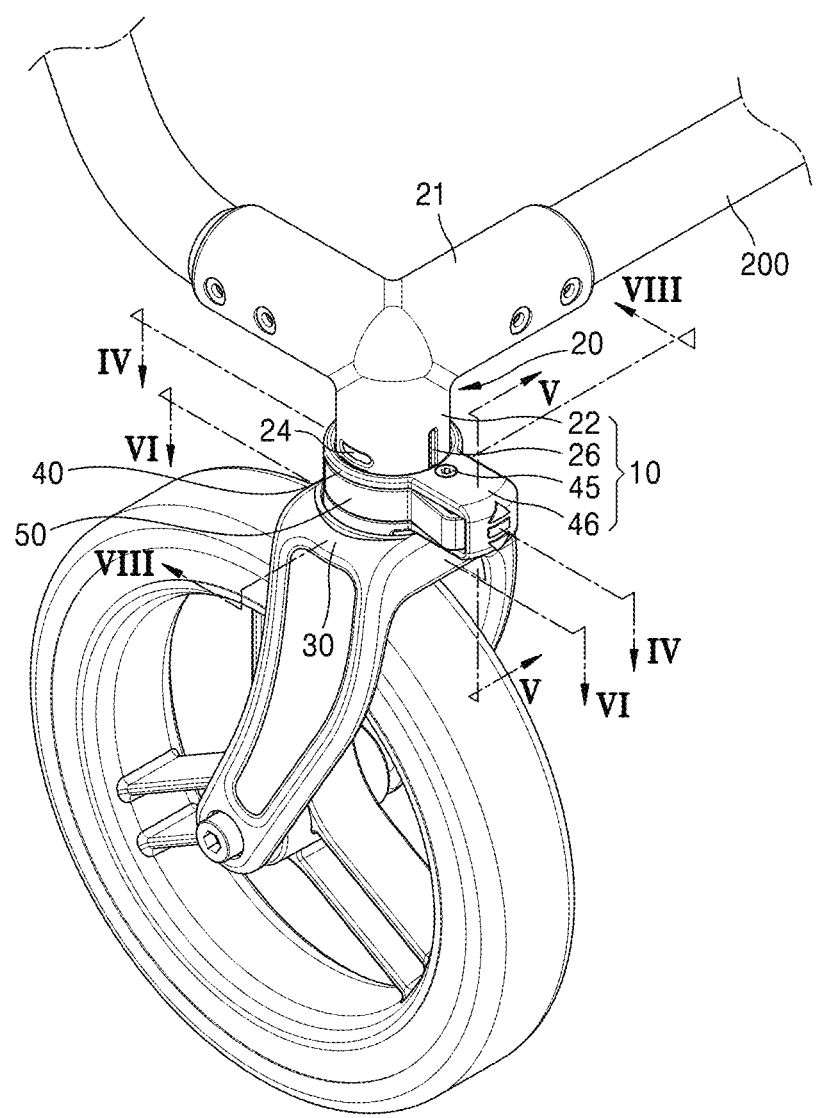
FIG. 2 is an enlarged view illustrating the wheel steering angle adjustment device shown in FIG. 1, according to an embodiment.
Figure 3:
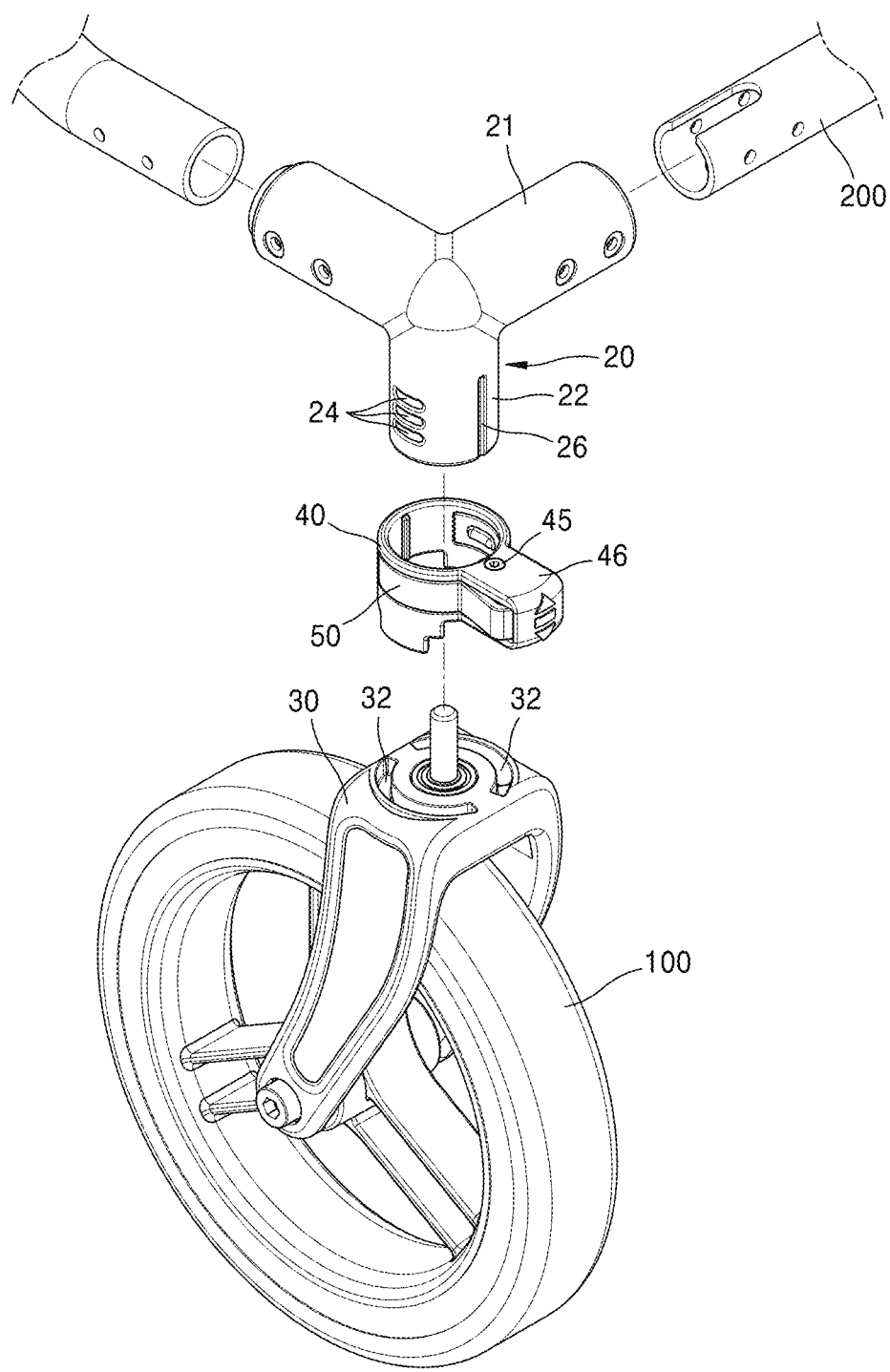
FIG. 3 is an exploded perspective view illustrating the wheel steering angle adjustment device shown in FIG. 2.
Figure 4:
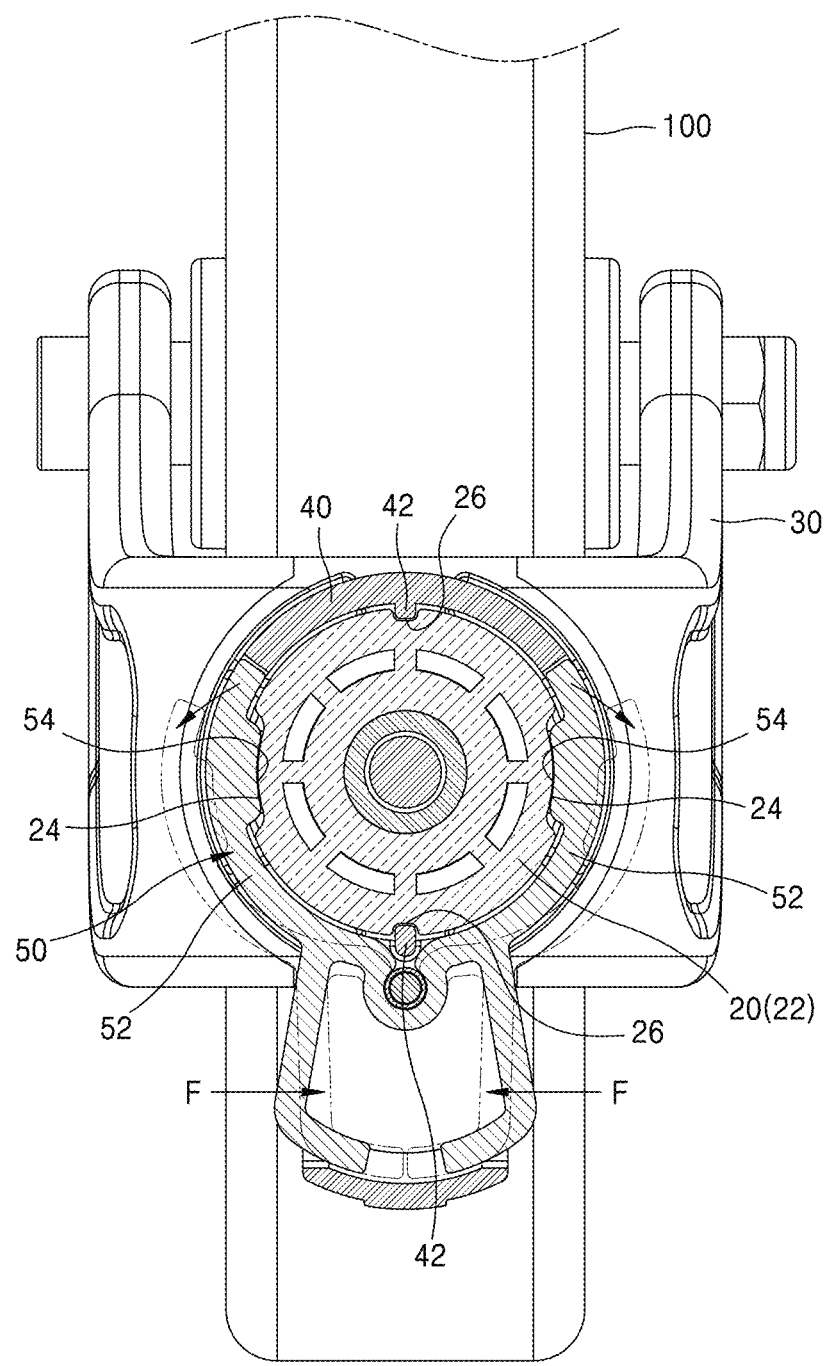
FIG. 4 is a cross-sectional view taken along line IV-IV of FIG. 2.
Figure 5:
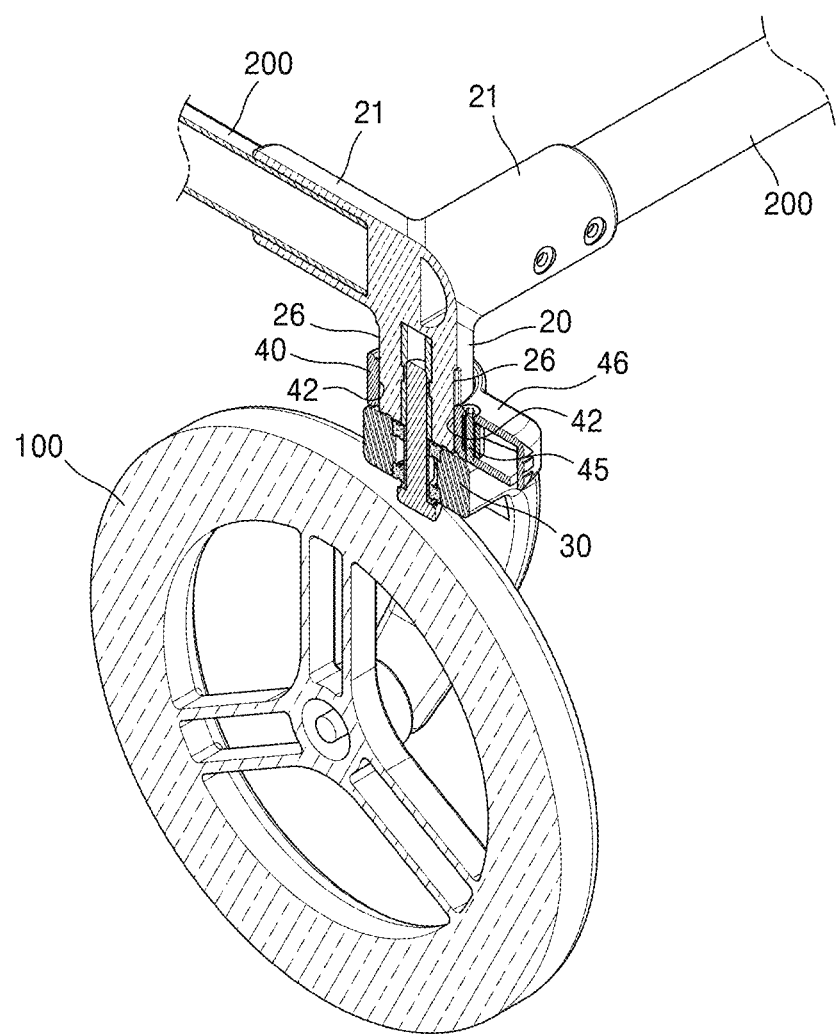
FIG. 5 is a cross-sectional view taken along line V-V of FIG. 2.
Figure 6:
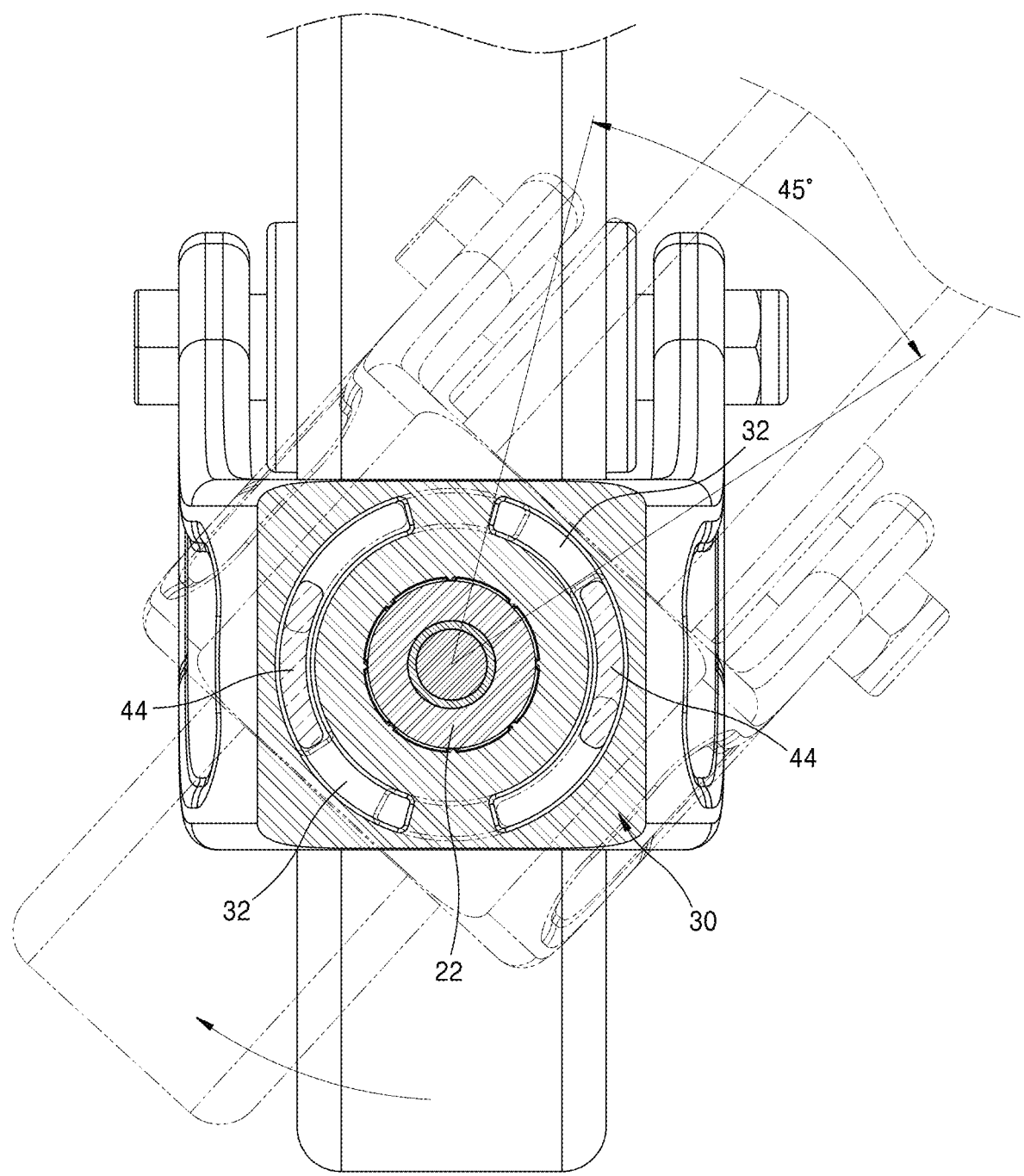
FIG. 6 is a cross-sectional view taken along the line VI-VI of FIG. 2, illustrating a state in which a rotation body is rotatable within the range of about 90° or less.
Figure 7:
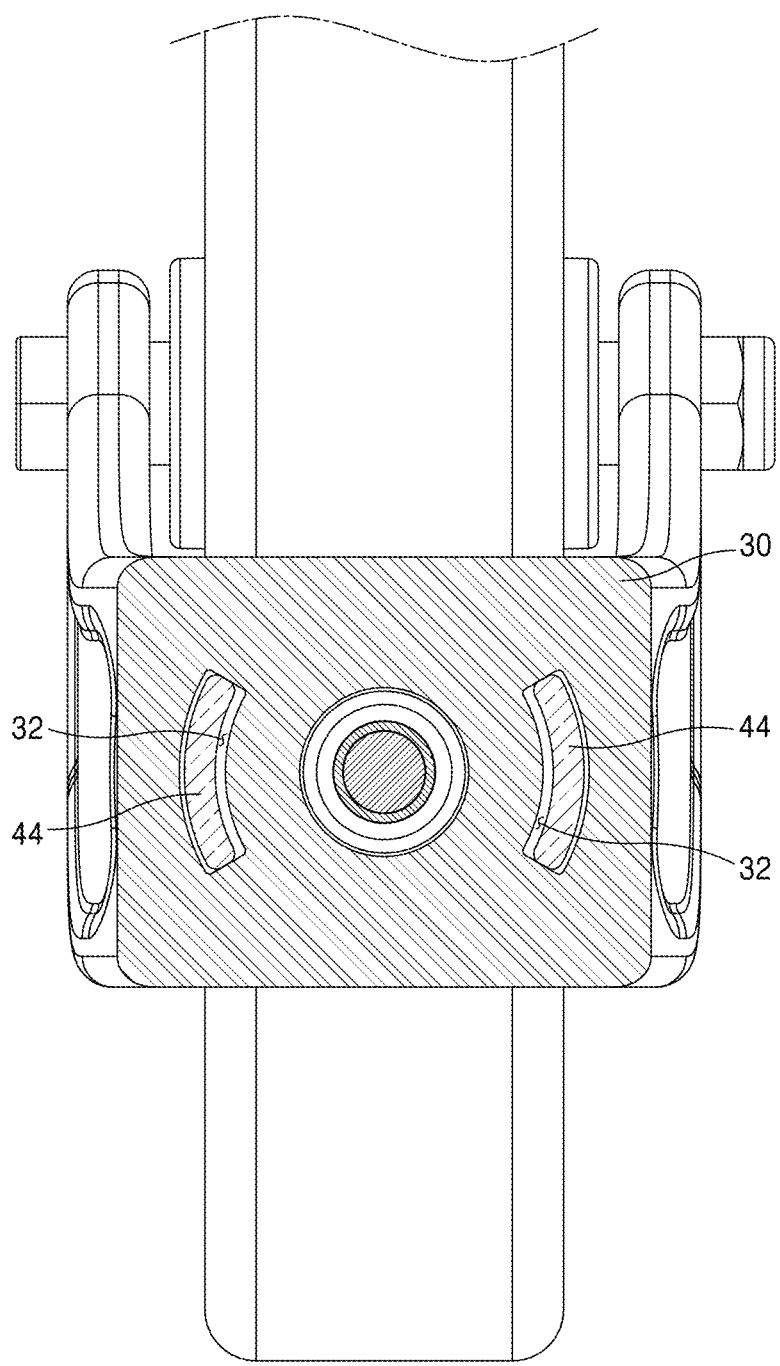
FIG. 7 is a view corresponding to FIG. 6 and illustrating a state in which the rotation body is fixed to a fixed body and not rotatable.
Figure 8:
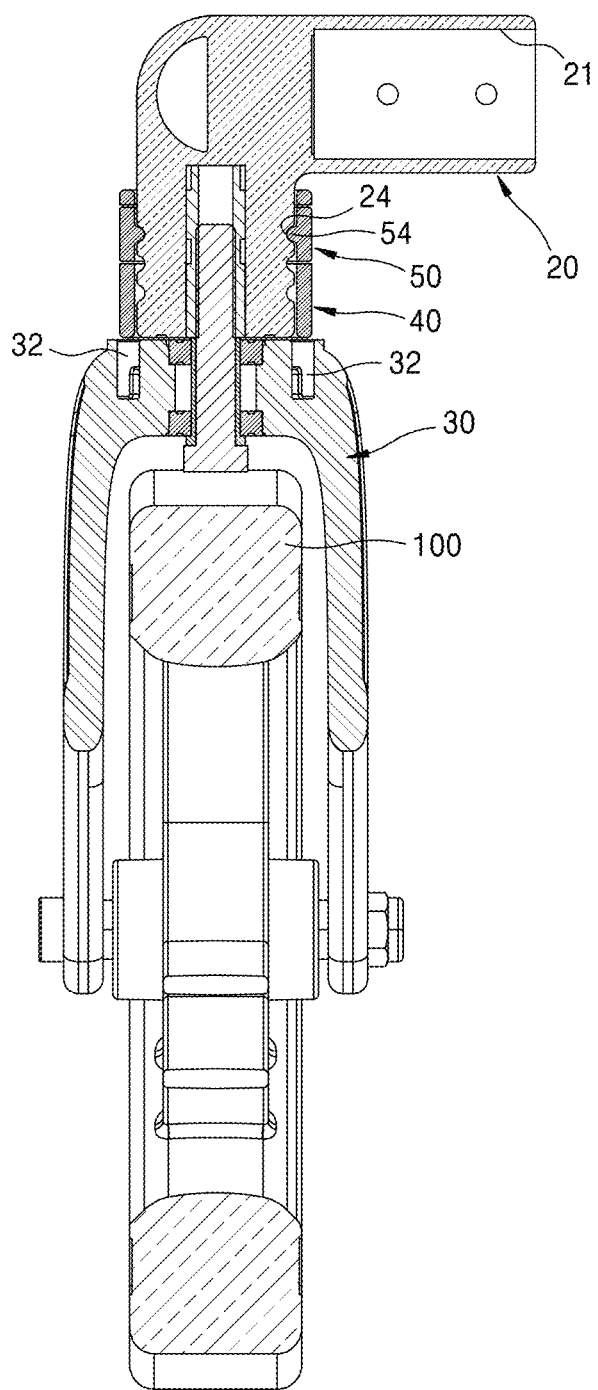
FIG. 8 is a cross-sectional view taken along line VIII-VIII of FIG. 2, illustrating a state in which the rotation body is rotatable about 360° or more with respect to the fixed body.

FIG. 1 is a view illustrating a walking aid employing a wheel steering angle adjustment device 10 according to an embodiment. FIG. 2 is an enlarged view illustrating the wheel steering angle adjustment device 10 shown in FIG. 1 according to an embodiment. FIG. 3 is an exploded perspective view illustrating the wheel steering angle adjustment device 10 shown in FIG. 2. FIG. 4 is a cross-sectional view taken along line IV-IV of FIG. 2. FIG. 5 is a cross-sectional view taken along line V-V of FIG. 2. FIG. 6 is a cross-sectional view taken along the line VI-VI of FIG. 2, illustrating a state in which a rotation body 30 is rotatable within the range of about 90° or less. FIG. 7 is a view corresponding to FIG. 6 and illustrating a state in which the rotation body 30 is fixed to a fixed body 20 and not rotatable. FIG. 8 is a cross-sectional view taken along line VIII-VIII of FIG. 2, illustrating a state in which the rotation body 30 is rotatable about 360° or more with respect to the fixed body 20.

Referring to FIGS. 1 to 8, in an embodiment, the wheel steering angle adjustment device 10 for a vehicle operated by manpower (hereinafter referred to as "wheel steering angle adjustment device 10") may include the fixed body 20, the rotation body 30, a lift member 40, and a locking switch 50.

The fixed body 20 includes a rotation support 22 having a cylindrical outer peripheral surface. The fixed body 20 may be formed by injection molding, for example, a synthetic resin material. Alternatively, the fixed body 20 may be formed by a 3D printing method. The fixed body 20 may include a vehicle-body coupling portion 21 configured to be coupled to a vehicle body 200. The vehicle-body coupling portion 21 may have a pipe shape and may be firmly fixed to the vehicle body 200 by using fasteners such as bolts or screws.

A fixing groove portion 24 and a slide groove portion 26 are provided in the outer peripheral surface of the rotation support 22.

The fixing groove portion 24 is concavely formed in the outer peripheral surface of the rotation support 22. A plurality of fixing groove portions 24 may be provided. In an embodiment, three pairs of fixing groove portions 24 may be provided. The fixing groove portions 24 are arranged at regular intervals in the longitudinal direction of the rotation support 22. In an embodiment, the fixing groove portions 24 may have a function of limiting the rotation angle of the rotation body 30 (described later) to about 360° or more, about 90° or less, and about 0° (fixed).

The slide groove portion 26 is concavely formed in the outer peripheral surface of the rotation support 22. The slide groove portion 26 is provided at a position not interfering with the fixing groove portions 24. In an embodiment, the slide groove portion 26 is provided at a position angled about 90° apart from the fixing groove portions 24 in the circumferential direction of the rotation support 22. The slide groove portion 26 extends in the longitudinal direction of the rotation support 22.

The rotation body 30 is provided below the fixed body 20. The rotation body 30 is rotatably installed on the fixed body 20. For example, the rotation body 30 may be rotatably installed on the fixed body 20 by using a ball bearing. The rotation body 30 is connected to a wheel 100. In an embodiment, the rotation body 30 has a fork structure which supports a rotation shaft of the wheel 100. The rotation body 30 may have another type of structure connected to the wheel 100.

The rotation body 30 includes rotation guide groove portions 32.

The rotation guide groove portions 32 are concavely formed in the upper surface of the rotation body 30. Each of the rotation guide groove portions 32 has a partial annular shape extending in a rotation direction of the rotation body 30. Each of the rotation guide groove portions 32 may include a plurality of multi-stage groove portions having different depths. As a rotation range limiting stopper 44 (described later) becomes stuck on an end portion of one of the multi-stage groove portions of the rotation guide groove portion 32, the rotational angle range of the rotation body 30 may be limited. The length of a relatively deep groove portion of the multi-stage groove portions may be less than the length of a relatively shallow groove portion of the multi-stage groove portions. In an embodiment, the depth of the rotation guide groove portion 32 may be formed in two stages. The shallower groove portion of the two-stage groove portions (multi-stage groove portions) allows the rotation body 30 to rotate relative to the fixed body 20 within the range of about 90° or less. In addition, the deeper groove portion of the two-stage groove portions completely restricts the rotation of the rotation body 30 by fixing the rotation body 30 relative to the fixed body 20. That is, when the rotation range limiting stopper 44 is accommodated in the deeper groove portion of the rotation guide groove portion 32, only forward or backward movement of the wheel 100 is possible. The rotation guide groove portion 32 may have three or more depths as needed.

The lift member 40 is for controlling the connection between the fixed body 20 and the rotation body 30. The lift member 40 is installed in a state in which the lift member 40 is coupled to the rotation support 22. In a state in which the lift member 40 is coupled to the rotation support 22, the lift member 40 is not rotatable relative to the rotation support 22. The lift member 40 is slidable in the longitudinal direction of the rotation support 22.

The lift member 40 includes a slide rail 42. The slide rail 42 protrudes from an inner peripheral surface of the lift member 40 toward the slide groove portion 26. The slide rail 42 is accommodated in the slide groove portion 26. In an embodiment, a pair of slide rails 42 may be provided. The slide rail 42 is a structure corresponding to the slide groove portion 26, and the number of slide rails 42 may be equal to or less than the number of slide groove portions 26.

The lift member 40 may have partially-open lateral portions such that the locking switch 50 (described later) may be installed in the lift member 40.

A hinge shaft 45 is installed in the lift member 40 such that the locking switch 50 (described later) may be installed in the lift member 40 using the hinge shaft 45. The hinge shaft 45 is installed between upper and lower surfaces of a lifting handle 46 of the lift member 40. The lifting handle 46 has closed upper and lower surfaces, a closed front surface, and open surfaces on both sides, thereby protecting a handle (described later) of the locking switch 50. The lifting handle 46 is a structure to which a user may easily apply a force with his/her finger when lifting or lowering the lift member 40.

The rotation range limiting stopper 44 is provided on a lower portion of the lift member 40. The rotation range limiting stopper 44 is selectively coupled to the rotation guide groove portion 32. As the lift member 40 is lowered or lifted with respect to the fixed body 20, the rotation range limiting stopper 44 may be coupled to the rotation guide groove portion 32 or may be completely separated from the rotation guide groove portion 32. When the rotation range limiting stopper 44 is lifted and completely separated from the rotation guide groove portion 32, the rotation body 30 is allowed to rotate about 360° or more relative to the fixed body 20. In addition, when the rotation range limiting stopper 44 is coupled to the deeper groove portion of the two-stage groove portions of the rotation guide groove portion 32, the rotation body 30 is not allowed to rotate relative to the fixed body 20. In addition, when the rotation range limiting stopper 44 is coupled to the shallower groove portion of the two-stage groove portions of the rotation guide groove portion 32, the rotation body 30 is allowed to rotate relative to the fixed body 20 within a given range. In this case, the rotation body 30 may be rotatable within a range of about 90° or less relative to the fixed body 20 according to an embodiment.

The locking switch 50 is installed in the lift member 40. The locking switch 50 may be detachably coupled to the fixing groove portions 24. For example, the locking switch 50 may include a member which operates like clothespin based on the hinge shaft 45 provided in the lift member 40. The locking switch 50 is a structure for determining the lifting or lowering of the lift member 40. The locking switch 50 includes: a switch body 52 which is provided on a side of the locking switch 50 based on the hinge shaft 45 to surround the rotation support 22; and a handle which is provided on the other side of the locking switch 50 based on the hinge shaft 45. The locking switch 50 may include a pair of symmetrical bodies and a handle which are symmetrically arranged based on the hinge shaft 45 in a clothespin-shape. When a force is applied to the handle of the locking switch 50, the switch body 52 may be moved away from the fixed body 20. When the force is removed from the handle of the locking switch 50, elastic restoring force may act to bring the switch body 52 closer to the fixed body 20.

The locking switch 50 includes fixing protrusions 54. The fixing protrusions 54 protrude from an inner peripheral surface of the switch body 52 toward the fixing groove portions 24. When the fixing protrusions 54 are coupled to the fixing groove portions 24, the lift member 40 is not vertically slidable with respect to the fixed body 20. When the fixing protrusions 54 are coupled to the fixing groove portions 24 formed at predetermined positions, the position of the lift member 40 is determined. As the position of the lift member 40 is changed, the angle range in which the rotation body 30 is rotatable relative to the fixed body 20 may vary. That is, as the fixing protrusions 54 are coupled to the fixing groove portions 24 provided at the predetermined positions, the coupling position of the rotation range limiting stopper 44 and the rotation guide groove portion 32 is determined. For example, the rotation guide groove portion 32 includes the multi-stage groove portions having different depths, and as the rotation range limiting stopper 44 becomes stuck on an end portion of one of the multi-stage groove portions of the rotation guide groove portion 32, the rotation angle of the rotation body 30 relative to the fixed body 20 may be limited.

Hereinafter, effects of the present disclosure will be described by taking as an example the case of using a walking aid which employs the wheel steering angle adjustment device 10 having the above-described elements.

A process of adjusting the steering angle of the wheel 100 when using a walking aid employing the wheel steering angle adjustment device 10 as shown in FIG. 1 will be described according to an embodiment.

Referring to FIG. 1, according to an embodiment, the fixed body 20 of the wheel steering angle adjustment device 10 is fixed to the vehicle body 200. In addition, the rotation body 30 has a fork structure to support the rotation shaft of the wheel 100. For example, only front wheels 100 among four wheels 100 may be provided with wheel steering angle adjustment devices 10. A user may apply force to the locking switch 50 with his/her finger to separate the fixing protrusions 54 from the fixing groove portions 24. While continuously applying the force to the locking switch 50 in the state, the lifting handle 46 may be lifted to completely separate the rotation range limiting stopper 44 from the rotation guide groove portion 32 as shown in FIG. 8. When the force applied to the locking switch 50 is removed, the fixing protrusions 54 are coupled to the fixing groove portions 24, thereby fixing the position of the lift member 40. In this state, the rotation range limiting stopper 44 is completely separate from the rotation guide groove portion 32 as shown in FIG. 8, and thus the rotation body 30 is freely rotatable relative to the fixed body 20 without angular limits such that the wheel 100 may be steered by 360° or more.

Thereafter, the user may apply force to the locking switch 50 with his/her finger to separate the fixing protrusions 54 from the fixing groove portions 24. While continuously applying the force to the locking switch 50 in that state, the lifting handle 46 may be pushed downward to couple the rotation range limiting stopper 44 to the shallow groove portion of the rotation guide groove portion 32. Then, when the force applied to the locking switch 50 is removed, the fixing protrusions 54 are coupled to the fixing groove portions 24, thereby fixing the position of the lift member 40. In this state, as shown in FIG. 6, the rotation body 30 is rotatable within a range of about 90° or less relative to the fixed body 20. Therefore, the wheel 100 may be prevented from being rotated more than necessary.

Thereafter, the user may apply force to the locking switch 50 with his/her finger to separate the fixing protrusions 54 from the fixing groove portions 24. While continuously applying the force to the locking switch 50 in that state, the lifting handle 46 may be further pushed downward to couple the rotation range limiting stopper 44 to the deeper groove portion of the rotation guide groove portion 32. In this state, the fixing protrusions 54 may be coupled to the fixing groove portions 24 by removing the force applied to the locking switch 50, and then the position of the lift member 40 may be fixed. In this state, as shown in FIG. 7, the rotation body 30 is not rotatable relative to the fixed body 20. Therefore, the wheel 100 is movable only forward or backward.

As described above, according to the one or more of the above embodiments, the wheel steering angle adjustment device 10 for a vehicle operated by manpower is configured such that the position of the locking switch 50 may be changed by applying force to the locking switch 50 having a clothespin-shape to selectively limit the angle range within which the rotation body 30 is rotatable relative to the fixed body 20, and thus, the wheel steering angle adjustment device 10 may be applied to vehicles operated by manpower such as walking aids, strollers, or manual carts to safely protect users and improve convenience.

In addition, the rotation range limiting stopper 44 provided on the lift member 40 and the rotation guide groove portion 32 provided in the rotation body 30 may be configured unlike in the above-described embodiments. For example, the rotation range limiting stopper 44 may be provided on the rotation body 30, and the rotation guide groove portion 32 may be provided on the lift member 40.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A wheel steering angle adjustment device for a vehicle operated by manpower, the wheel steering angle adjustment device comprising:
    a fixed body comprising a rotation support having a cylindrical outer peripheral surface;
    a rotation body arranged below the fixed body and rotatably installed on the fixed body;
    a lift member installed such that when the lift member is coupled to the rotation support, the lift member is not rotatable relative to the rotation support but is slidable in a longitudinal direction of the rotation support;
    a locking switch coupled to the lift member;
    a plurality of fixing groove portions provided concavely in the cylindrical outer peripheral surface of the rotation support at regular intervals in the longitudinal direction of the rotation support;
    a fixing protrusion protruding from the locking switch and configured to be detachably coupled to the plurality of fixing groove portions;
    a rotation range limiting stopper provided on a lower portion of the lift member; and
    a rotation guide groove portion provided concavely in an upper surface of the rotation body and extending in a rotation direction of the rotation body,
    wherein, as the rotation range limiting stopper becomes stuck on an end portion of the rotation guide groove portion, an angle by which the rotation body is rotatable relative to the fixed body is limited, and
    wherein the rotation guide groove portion comprises multi-stage groove portions having different depths, each depth corresponding to a different angular range, and the angle by which the rotation body is rotatable relative to the fixed body is limited as the rotation range limiting stopper becomes stuck on an end portion of one of the multiple-stage groove portions of the rotation guide groove portion.

2. The wheel steering angle adjustment device of claim 1, wherein the locking switch comprises a first arm and a second arm rotatable about a hinge shaft provided in the lift member.

3. The wheel steering angle adjustment device of claim 1, further comprising: a slide groove portion which is provided concavely in the cylindrical outer peripheral surface of the rotation support at a position not interfering with the plurality of fixing groove portions and extends in the longitudinal direction of the rotation support;
    and a slide rail which protrudes from the lift member and is accommodated in the slide groove portion.

4. The wheel steering angle adjustment device of claim 1, wherein the lift member comprises a lifting handle configured to protect a handle of the locking switch and receive an external force when the lift member is lifted and lowered.

* * * * *